United States Patent
Wu et al.

(10) Patent No.: US 11,412,201 B2
(45) Date of Patent: Aug. 9, 2022

(54) CALIBRATED PHOTO-DETECTING APPARATUS AND CALIBRATION METHOD THEREOF

(71) Applicant: Artilux, Inc., Menlo Park, CA (US)

(72) Inventors: Pai-Chuan Wu, Hsinchu County (TW); Pai-Ting Huang, Hsinchu County (TW); Feng-Cheng Chu, Hsinchu County (TW); Yun-Chung Na, Hsinchu County (TW); Chien-Lung Chen, Hsinchu County (TW)

(73) Assignee: ARTILUX, INC., Menlo Park, CA (US)

( * ) Notice: Subject to any disclaimer, the term of this patent is extended or adjusted under 35 U.S.C. 154(b) by 5 days.

(21) Appl. No.: 17/033,640

(22) Filed: Sep. 25, 2020

(65) Prior Publication Data
US 2021/0099688 A1 Apr. 1, 2021

Related U.S. Application Data

(60) Provisional application No. 62/930,582, filed on Nov. 5, 2019, provisional application No. 62/906,112, filed on Sep. 26, 2019.

(51) Int. Cl.
*H04N 13/246* (2018.01)
*H04N 13/243* (2018.01)

(52) U.S. Cl.
CPC ......... *H04N 13/246* (2018.05); *H04N 13/243* (2018.05)

(58) Field of Classification Search
CPC .... H04N 13/243; H04N 13/246; G06T 5/002; G06T 5/20; G06T 5/009; G06T 5/50
See application file for complete search history.

(56) References Cited

U.S. PATENT DOCUMENTS

| | | | |
|---|---|---|---|
| 10,134,926 B2 * | 11/2018 | Akkaya | H01L 27/14629 |
| 11,102,433 B2 * | 8/2021 | Kajiwara | H04N 5/3741 |
| 2011/0254923 A1 * | 10/2011 | Choi | G06T 7/80 |
| | | | 348/46 |
| 2012/0176476 A1 | 7/2012 | Schmidt | |
| 2015/0302570 A1 | 10/2015 | Shirakyan | |
| 2018/0130843 A1 * | 5/2018 | Jo | H01L 27/14667 |
| 2018/0302611 A1 | 10/2018 | Baak | |
| 2018/0313955 A1 | 11/2018 | Xu | |
| 2019/0369219 A1 * | 12/2019 | Ercan | G01S 7/4815 |

(Continued)

OTHER PUBLICATIONS

Aberg, I. et al., "A Low Dark Current and High Quantum Efficiency Monolithic Germanium-on-Silicon CMOS Imager Technology for Day and Night Imaging Applications", In Proceedings of IEEE International Electron Devices Meeting, Dec. 2010, 4 pages (Year: 2010).*

Primary Examiner — Rowina J Cattungal
(74) Attorney, Agent, or Firm — Dority & Manning, P.A.

(57) ABSTRACT

A photo-detecting apparatus includes an image sensor and a 3D image generator. The image sensor having a plurality of 3D photodetectors is configured to output a raw data. The 3D image generator having a storage medium for storing a calibration data is configured to output a 3D image according to the raw data and the calibration data. The calibration data includes at least one of an IQ-mismatch calibration data, a non-linearity calibration data, a temperature calibration data and an offset calibration data.

19 Claims, 22 Drawing Sheets

(56) References Cited

U.S. PATENT DOCUMENTS

| | | | |
|---|---|---|---|
| 2020/0111823 A1* | 4/2020 | Jin | H01L 27/14612 |
| 2020/0349728 A1* | 11/2020 | Bitan | G01S 7/497 |
| 2021/0248719 A1* | 8/2021 | Park | G06T 5/50 |
| 2021/0250535 A1* | 8/2021 | Lee | H04N 13/271 |
| 2021/0383561 A1* | 12/2021 | Lee | H04N 5/33 |

* cited by examiner

| Measured depth range (cm) | Depth compensation (cm) |
|---|---|
| 25-35 | 0.1 |
| 35-45 | 0.2 |
| 45-55 | 0.3 |
| 55-65 | 0.1 |
| 65-75 | 0.5 |
| 75-85 | 0.2 |
| 85-95 | 0.5 |
| 95-105 | 0.8 |
| 105-115 | 0.6 |
| 115-125 | 0.2 |
| 125-135 | 0.3 |

FIG. 3C

| Measured depth range (cm) | Depth compensation (cm) |
|---|---|
| 25-35 | 0 |
| 35-45 | 0.1 |
| 45-55 | 0.4 |
| 55-65 | 0.4 |
| 65-75 | 0.1 |
| 75-85 | 0 |
| 85-95 | 0.1 |
| 95-105 | 0.4 |
| 105-115 | 0.4 |
| 115-125 | 0.1 |
| 125-135 | 0 |

FIG. 3E

| Temperature (°C) | Depth compensation (cm) |
|---|---|
| 20-25 | 0.1 |
| 25-30 | 0.2 |
| 30-35 | 0.3 |
| 35-40 | 0.4 |
| 40-15 | 0.5 |
| 45-50 | 0.6 |
| 50-55 | 0.7 |
| 55-60 | 0.8 |

FIG. 3G

| Pixels | Depth compensation (cm) |
|---|---|
| All | 0.5 |

FIG. 3I

| Pixels | Depth compensation (cm) |
|---|---|
| 1st Pixel | 0.3 |
| 2nd Pixel | 0.5 |
| ... | ... |
| Tth Pixel 1 | 1.5 |

FIG. 3K

CALIBRATED PHOTO-DETECTING APPARATUS AND CALIBRATION METHOD THEREOF

CROSS REFERENCE TO RELATED APPLICATION

This application claims benefit of U.S. provisional Application No. 62/930,582 filed on 2019 Nov. 5 and U.S. provisional Application No. 62/906,112 filed on 2019 Sep. 26, which are incorporated by reference herein in its entirety.

BACKGROUND

Image sensors are widely used in many electronic devices such as a digital still camera, a smart phone, a video camera, a vehicle camera or a camera drone. More and more electronic devices are equipped with 2-dimensional (2D) and 3-dimensional (3D) image sensors, which include a plurality of photodetectors for performing optical-to-electrical conversion.

Time-of-Flight (ToF) sensor is one kind of 3D image sensors, which measures a depth by correlating the phase delay between a modulated signal transmitted by a transmitter and a reflected modulated signal received by a receiver, where the receiver includes a plurality of photodetectors. However, several non-ideal factors (e.g., mismatch or dark current) existed in the plurality of the photodetectors will affect the sensing accuracy of the ToF sensor, which may cause the erroneous results on the depth measurement. Therefore, there is a need for providing a calibrated photo-detecting apparatus and proving a calibration method for the photo-detecting apparatus.

SUMMARY

According to an embodiment of the present disclosure, a photo-detecting apparatus is provided. The photo-detecting apparatus includes an image sensor having a plurality of 3D photodetectors, configured to output a raw data; and a 3D image generator having a storage medium storing a calibration data, configured to output a 3D image based on the raw data and the calibration data; wherein the calibration data includes an IQ-mismatch calibration data, a non-linearity calibration data, a temperature calibration data or an offset calibration data.

According to an embodiment of the present disclosure, a calibration method is provided. The calibration includes providing an image sensor having a plurality of 3D photodetectors and outputting a raw data; and providing a 3D image generator having a storage medium storing a calibration data and outputting a 3D image based on the raw data and the calibration data; wherein the calibration data includes an IQ-mismatch calibration data, a non-linearity calibration data, a temperature calibration data or an offset calibration data.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

FIG. 3C illustrates an IQ-mismatch calibration data, according to some embodiments.

FIG. 3E illustrates a non-linear calibration data, according to some embodiments.

FIG. 3G illustrates a temperature calibration data, according to some embodiments.

FIG. 3I illustrates a global offset calibration data, according to some embodiments.

FIG. 3K illustrates a pixel offset calibration data, according to some embodiments.

DETAILED DESCRIPTION

Figure 1:
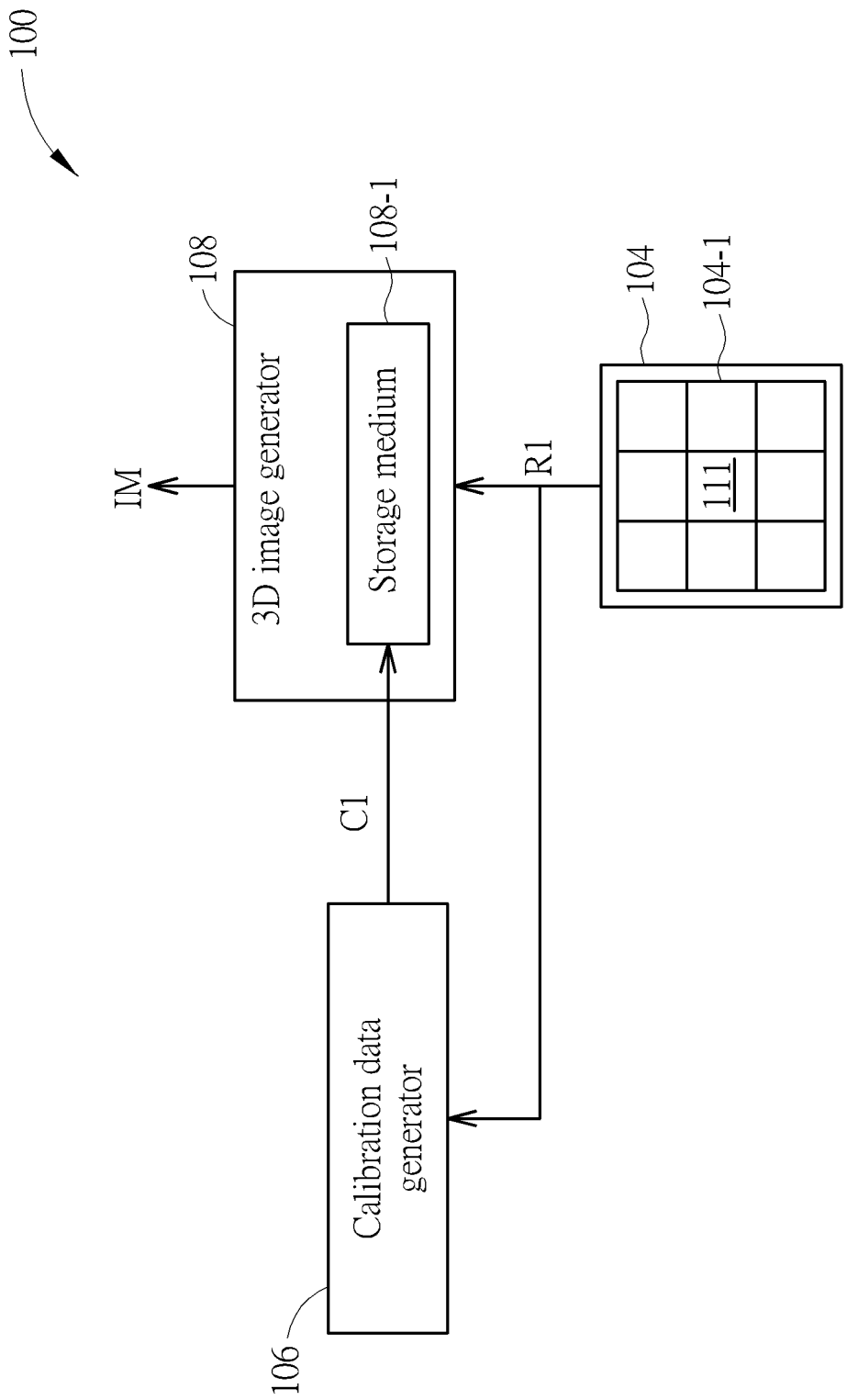
FIG. 1 illustrates a diagram of a photo-detecting apparatus, according to some embodiments.

FIG. 1 illustrates a diagram of a photo-detecting apparatus 100. The photo-detecting apparatus 100 includes an image sensor 104, a calibration data generator 106 and a 3D image generator 108. The Image sensor 104 includes a plurality of 3D photodetectors 111 to collectively form a pixel array 104-1. The image sensor 104 is configured to generate raw data R1 through the pixel array 104-1. The calibration data generator 106 is configured to generate calibration data C1 to the 3D image generator 108, where the 3D image generator 108 is configured to generate a 3D image IM according to the raw data R1 and the calibration data C1. The calibration data C1 may be stored at a storage medium 108-1 (e.g., register or flash memory). In some embodiments, the calibration data C1 can be referenced by the 3D image generator 108 as a look-up table during operation. The 3D image generator 108 can be implemented by digital processor (DSP), general purpose processor, application-specific integrated circuit (ASIC), digital circuitry, software module, or any combinations thereof.

In some embodiments, the photo-detecting apparatus 100 can be implemented in electronic devices such as a digital still camera, a smart phone, a video camera, a vehicle camera or a camera drone. Notably, as the calibration data generator 106 can be a non-portable equipment (e.g., a lab equipment) and the calibration data C1 can be pre-stored into the storage medium 108-1 before the production of the electronic devices, the electronic devices may not include the calibration data generator 106 therein. In other words, in some embodiments, the calibration data generator 106 is an element which will not be implemented into the end product.

Figure 2:
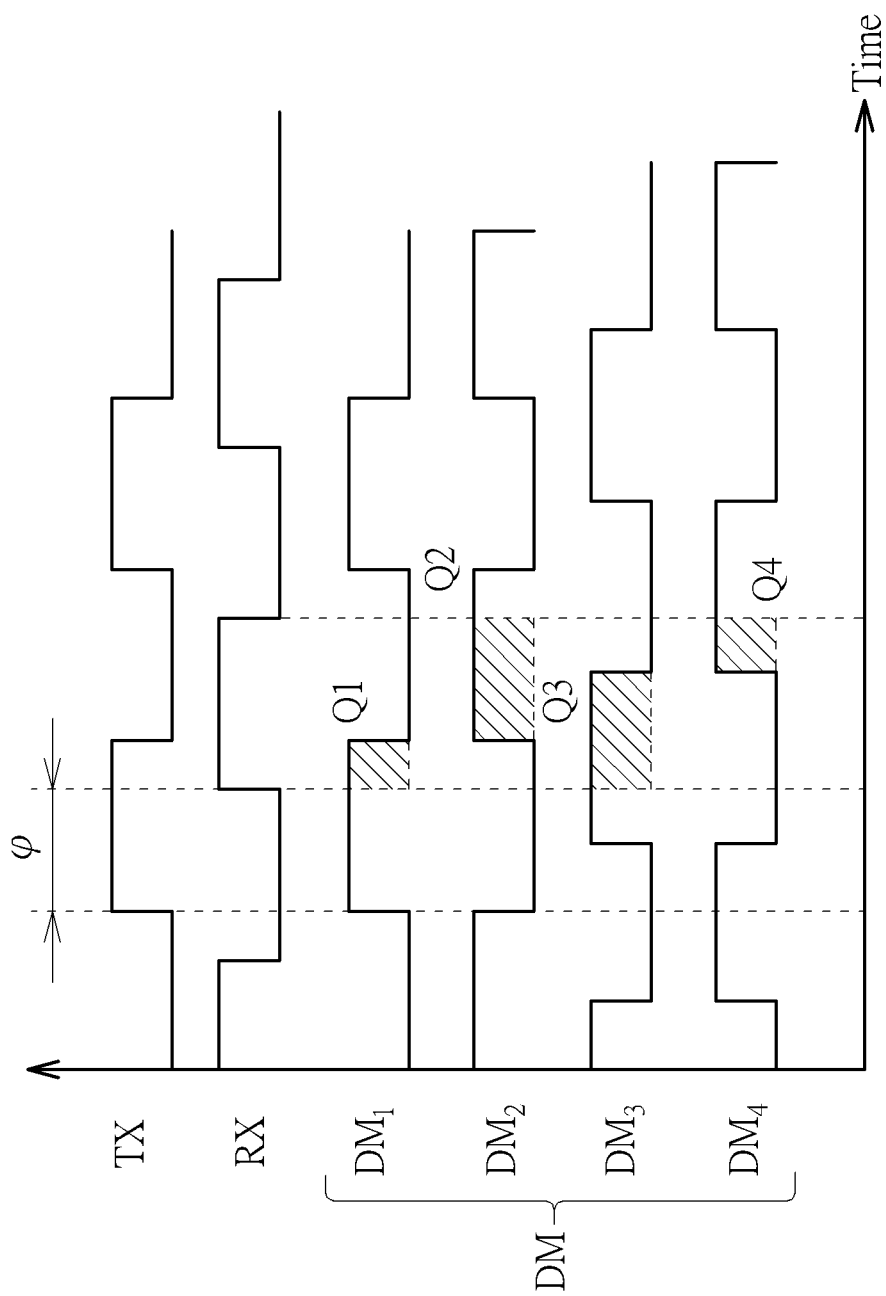
FIG. 2 illustrates a timing diagram of a ToF application, according to some embodiments.

FIG. 2 illustrates a timing diagram of a ToF application. Transmitting signal TX is a signal transmitted from a transmitter, which in this example is a square wave modulation signal. Receiving signal RX is a signal received by the image sensor 104, where the receiving signal RX is the transmitting signal TX reflected from a target object (e.g., face or fingerprint). As there is a distance between the photo-detecting apparatus 100 and the target object, transmitting signal TX and receiving signal RX has a phase delay $\varphi$ therebetween. Demodulation signal DM in this example is also a square wave signal, configured to control the 3D photodetectors 111 of the image sensor 104, including four phases, where a first phase DM1 represents 0-degree, a second phase DM2 represents 180-degree, a third phase DM3 represents 90-degree and a fourth phase DM4 represents 270-degree from the transmitting signal TX. These four phases will be applied to the 3D photodetectors 111 in turn. For example, the demodulation signal DM applies the first phase DM1 to control the 3D photodetectors 111 at a first time frame, applies the second phase DM2 to control the 3D photodetectors 111 at a second time frame, applies the third phase DM3 to control the 3D photodetectors 111 at a third time frame, and applies the fourth phase DM4 to control the 3D photodetectors 111 at a fourth time frame. Four-phase demodulation signal DM is just an example, and one may use other numbers of phase as a demodulation signal to control the 3D photodetectors 111. The image sensor 104 is configured to output the raw data R1 to the calibration data generator 106 and 3D image generator 108, where the raw data R1 includes at least one or more phase-difference data Q1, Q2, Q3 and Q4. Specifically, these phase-difference data Q1, Q2, Q3 and Q4 relate to the phase-difference between the receiving signal RX and demodulation signal DM (or transmitting signal TX), as shown in FIG. 2.

Figure 3A:
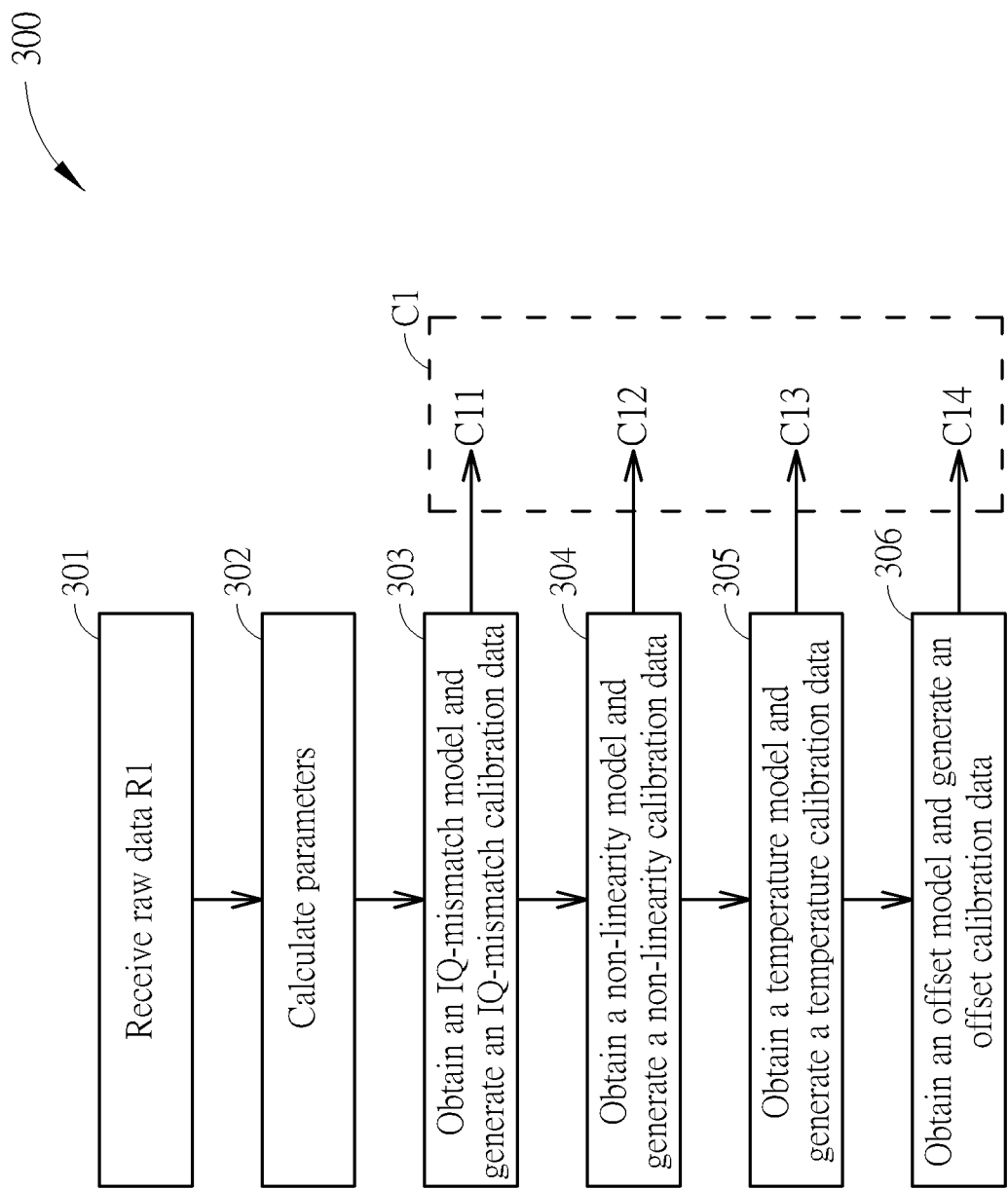
FIG. 3A illustrates a flowchart of generating the calibration data, according to some embodiments.

FIG. 3A illustrates a flowchart 300 generating the calibration data C1, which is performed by the calibration data generator 106. In this embodiment, the calibration items include IQ-mismatch, non-linearity, temperature and offset, and example steps of generating the calibration data C1 as show below:

Step 301: receive the raw data R1.

Step 302: calculate one or more parameters according to the raw data R1.

Step 303: obtain an IQ-mismatch model and generate an IQ-mismatch calibration data C11 according to the one or more parameters.

Step 304: obtain a non-linearity model and generate a non-linearity calibration data C12 according to the one or more parameters.

Step 305: obtain a temperature model and generate a temperature calibration data C13 according to the one or more parameters.

Step 306: obtain an offset model and generate an offset calibration data C14 according to the one or more parameters.

In step 302, one or multiple parameters may be obtained, such as an I-value $V_I$, a Q-value $V_Q$, a pixel intensity A, a phase delay $\varphi$ and a distance DIS. In one embodiment, these parameters can be obtained according to the equations shown below:

$V_I=(Q2-Q1)$ $V_Q=(Q4-Q3)$ $A=(V_Q^2+V_I^2)^{1/2}$ $B=(Q1+Q2+Q3+Q4)/4$ $\varphi=\arctan(V_Q/V_I)$ $DIS=(c/2F_{mod})\times(\varphi/2\pi)$ where c is speed of light and Fmod is the modulation frequency.

Steps 303 to 306 are the steps to generate the IQ-mismatch calibration data C11, non-linearity C12, temperature calibration data C13 and offset calibration data C14, respectively. These steps will be introduced below and in connection with FIG. 3B to FIG. 3K.

In step 303, the IQ-mismatch model and the IQ-mismatch calibration data C11 are generated according to the one or more parameters generated in Step 302. Ideally, if there is no IQ-mismatch, I-value $V_I$ is equal to Q-value $V_Q$. However, if there is a mismatch between I-value $V_I$ and Q-value $V_Q$, this mismatch will cause a depth error $D_{ERR1}$. The depth error $D_{ERR1}$ indicates the difference between the measured depth and the actual depth. For example, when actual depth is 130 cm and measured depth is 130.3 cm, the depth error $D_{ERR1}$ is 0.3 cm. In order to generate the IQ-mismatch calibration data C11, an IQ-mismatch model has to be established.

Figure 3B:
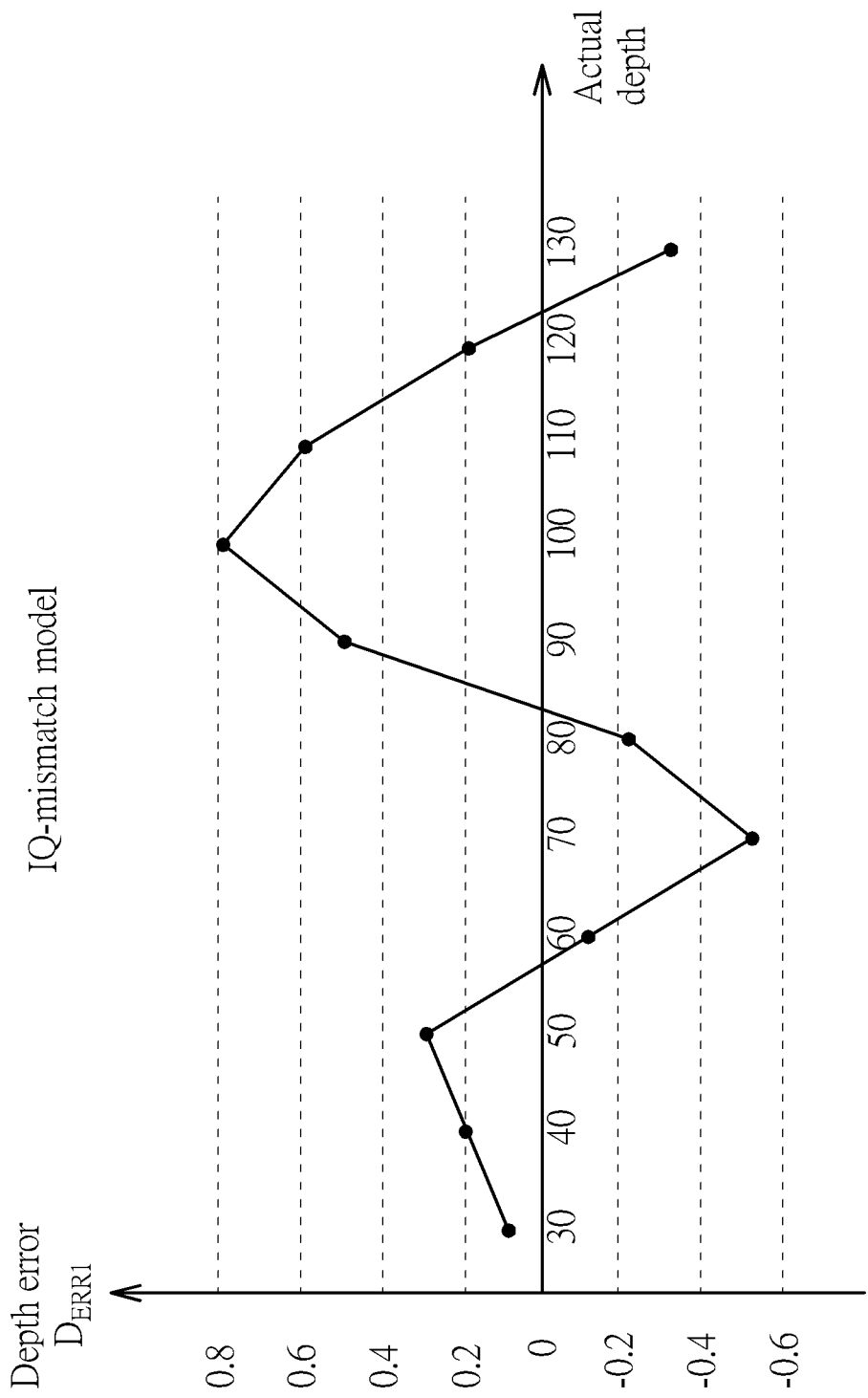
FIG. 3B illustrates an IQ-mismatch model, according to some embodiments.

An example of the IQ-mismatch model can refer to FIG. 3B. As illustrated in FIG. 3B, the depth error $D_{ERR1}$ caused by IQ-mismatch will be varied in accordance with the actual depth. In one embodiment, this IQ-mismatch model can be obtained by experiment. Furthermore, the IQ-mismatch calibration data C11 can be obtained according the IQ-mismatch model. FIG. 3C illustrates an example of the IQ-mismatch calibration data C11, which corresponds to the IQ-mismatch model illustrated in FIG. 3B. The IQ-mismatch calibration data C11 can be written into the storage medium 108-1 to form a look-up table inside the 3D image generator 108, such that the 3D image generator 108 can generate the 3D image IM based on the raw data R1 and the IQ-mismatch calibration data C11 stored in the storage medium 108-1.

In step 304, the non-linearity model and the non-linearity calibration data C12 are generated according to the one or more parameters generated in step 302. In general, as modulation and demodulation waveforms are not an ideal square wave, these non-ideal waveforms may cause non-linear error and further the depth error.

Figure 3D:
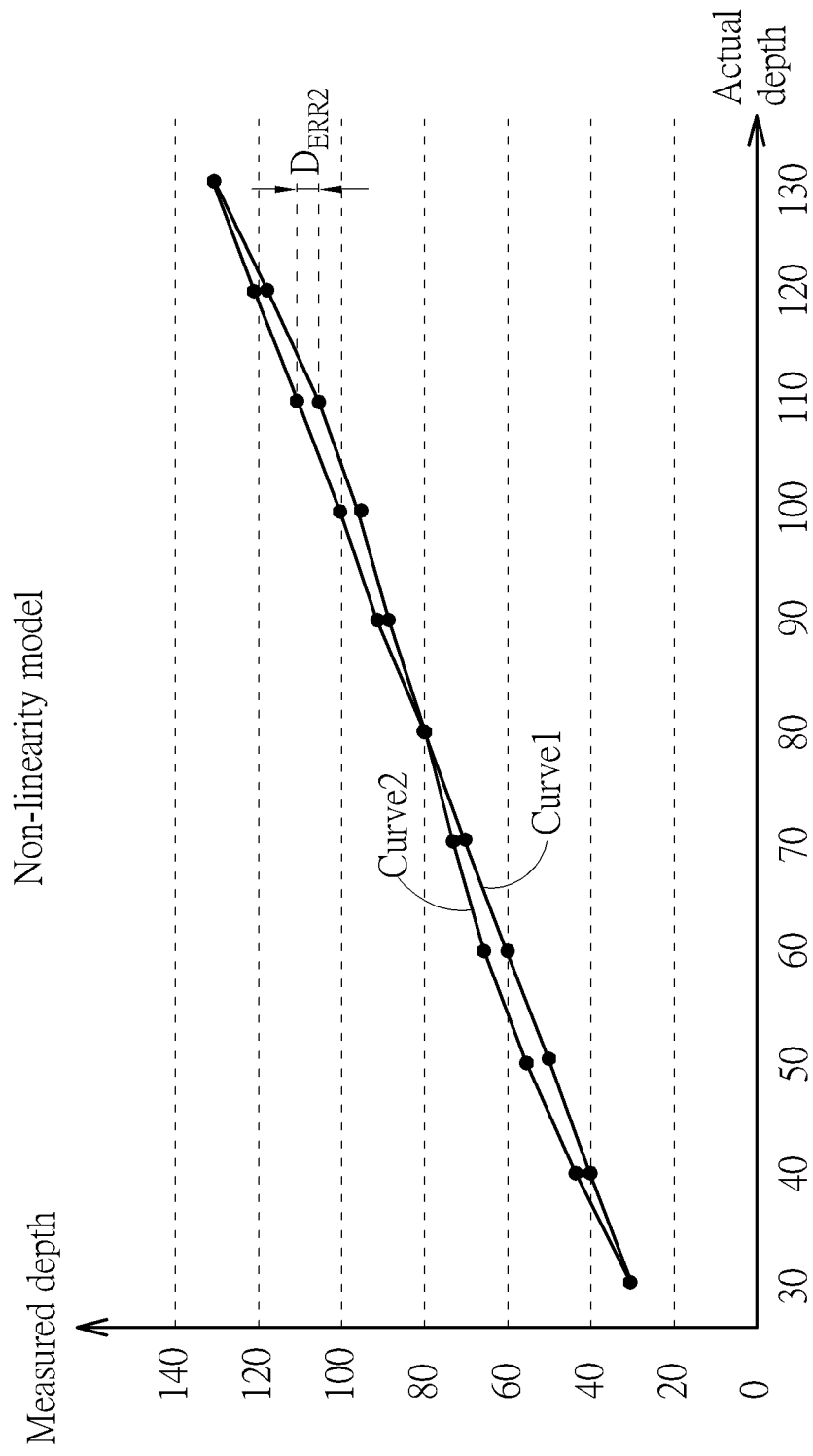
FIG. 3D illustrates a non-linear model, according to some embodiments.
Figure 3F:
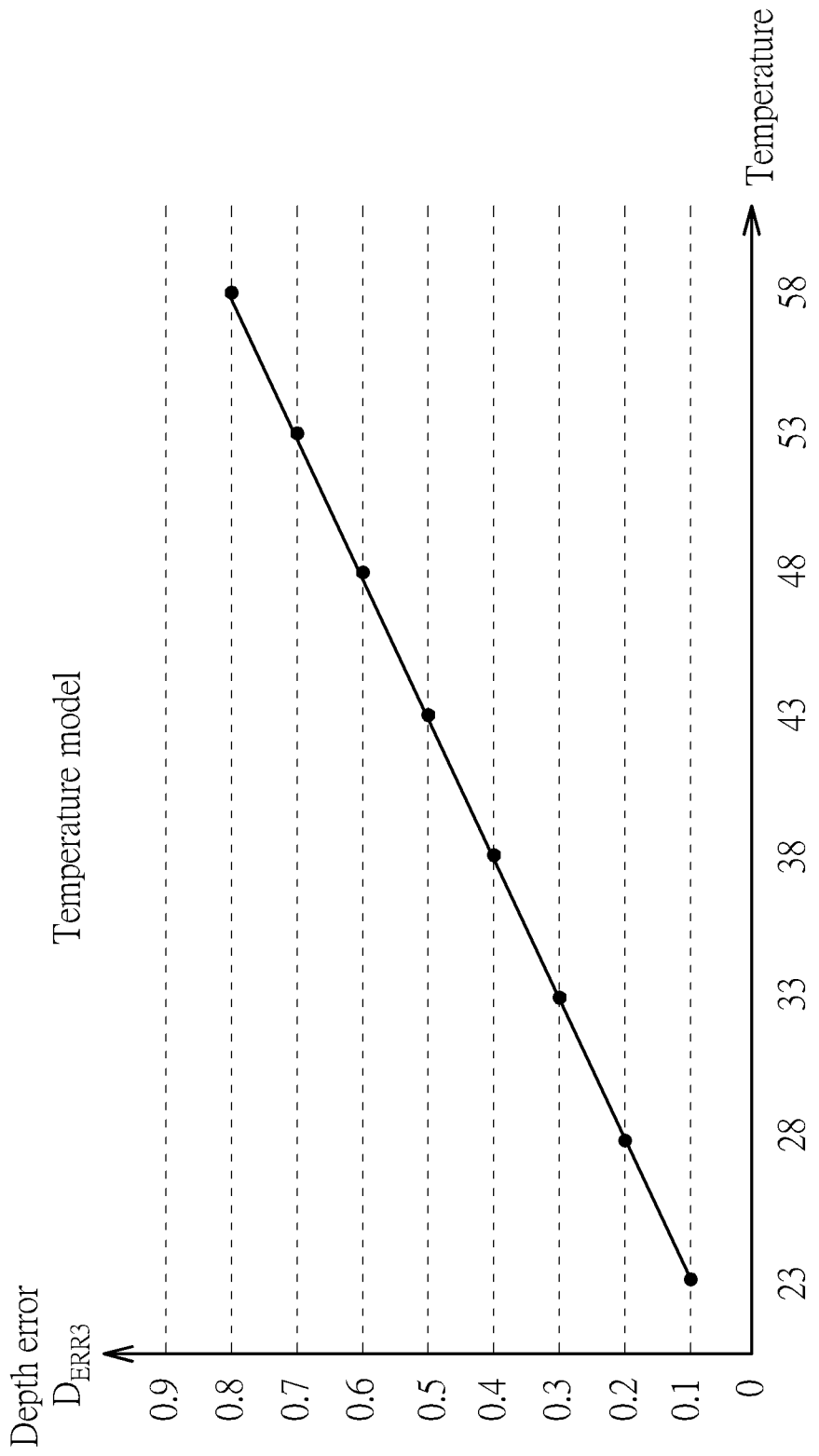
FIG. 3F illustrates a temperature model, according to some embodiments.

An example of the non-linearity model can refer to FIG. 3D. A curve Curve 1 illustrated in FIG. 3D represents an ideal relationship between the measured depth and the actual depth. A curve Curve 2 represents a non-ideal relationship between the measured depth and the actual depth when a non-linear error occurs. As illustrated in FIG. 3D, the depth error $D_{ERR2}$, which is the difference between Curve 1 and Curve 2, caused by non-linearity will be varied in accordance with the actual depth. In one embodiment, this non-linearity model can be obtained by experiment. Furthermore, the non-linearity calibration data C12 can be obtained according the non-linearity model. FIG. 3E illustrates an example of the non-linearity calibration data C12, which corresponds to the non-linearity model illustrated in FIG.

3D. The non-linearity calibration data C12 can be written into the storage medium 108-1 to form a look-up table inside the 3D image generator 108, such that the 3D image generator 108 can generate the 3D image IM based on the raw data R1 and the non-linearity calibration data C12 stored in the storage medium 108-1.

In step 305, the temperature model and the temperature calibration data C13 are generated according to the one or more parameters generated in Step 302. Temperature is a factor causing depth error $D_{ERR3}$. Please refer to FIG. 3F, which illustrates a temperature model according to an embodiment. As illustrated, the depth error $D_{ERR3}$ is proportional to the temperature (i.e., higher temperature leads to a higher depth error $D_{ERR3}$). After obtaining the temperature model, the temperature calibration data C13 as illustrated in FIG. 3G can be generated and written into the storage medium 108-1 to form a look-up table inside the 3D image generator 108. As such the 3D image generator 108 can generate the 3D image IM based on the raw data R1 and the temperature calibration data C13 stored in the storage medium 108-1.

In step 306, the offset model and the offset calibration data C14 are generated according to the one or more parameters generated in Step 302. There are two of offsets that may need to be compensated. One is global offset and the other is pixel offset. Global offset is caused by signal delay inside a system and pixel offset is caused by manufacturing tolerance. Since global offset is a systematic offset, all the pixels can be compensated by the same value. Pixel offset is an offset that occurs in each pixel, and can be compensated per pixel.

Figure 3H:
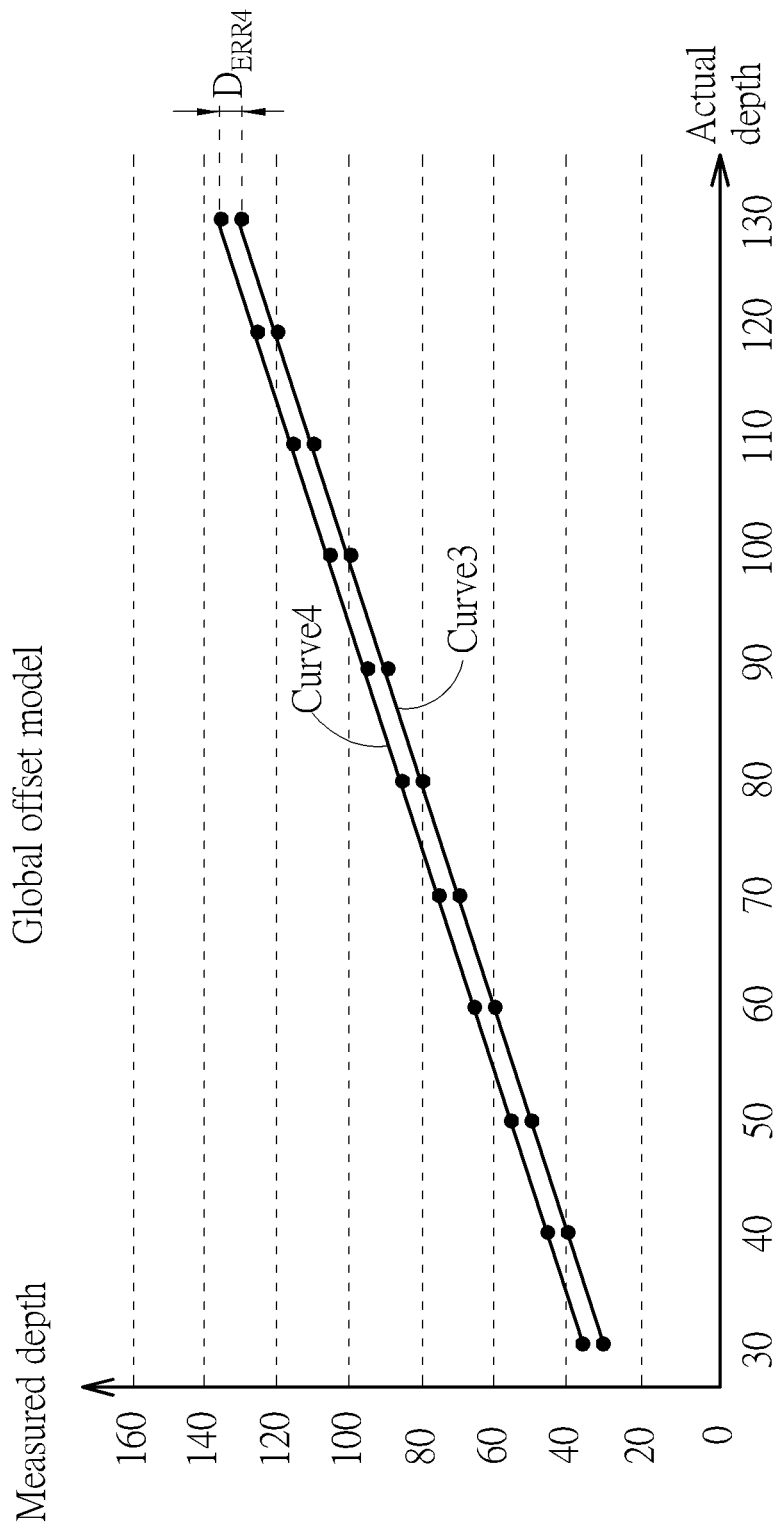
FIG. 3H illustrates a global offset model, according to some embodiments.
Figure 3I:
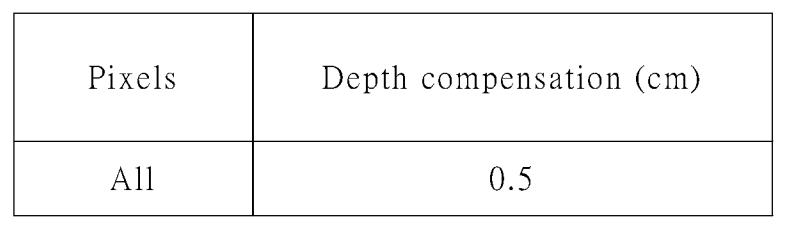

FIG. 3H illustrates a global offset model according to an embodiment. As illustrated, a fixed depth error $D_{ERR4}$. (e.g., 0.5 cm) is incurred in all the pixels regardless of the value of the actual depth. After obtaining the global offset model, the global offset calibration data C14-1 as illustrated in FIG. 3I, which is a part of the offset calibration data C14, can be generated and written into the storage medium 108-1 inside the 3D image generator 108. As such, the 3D image generator 108 can generate the 3D image IM based on the raw data R1 and the global offset calibration data C14-1 stored in the storage medium 108-1.

Figure 3J:
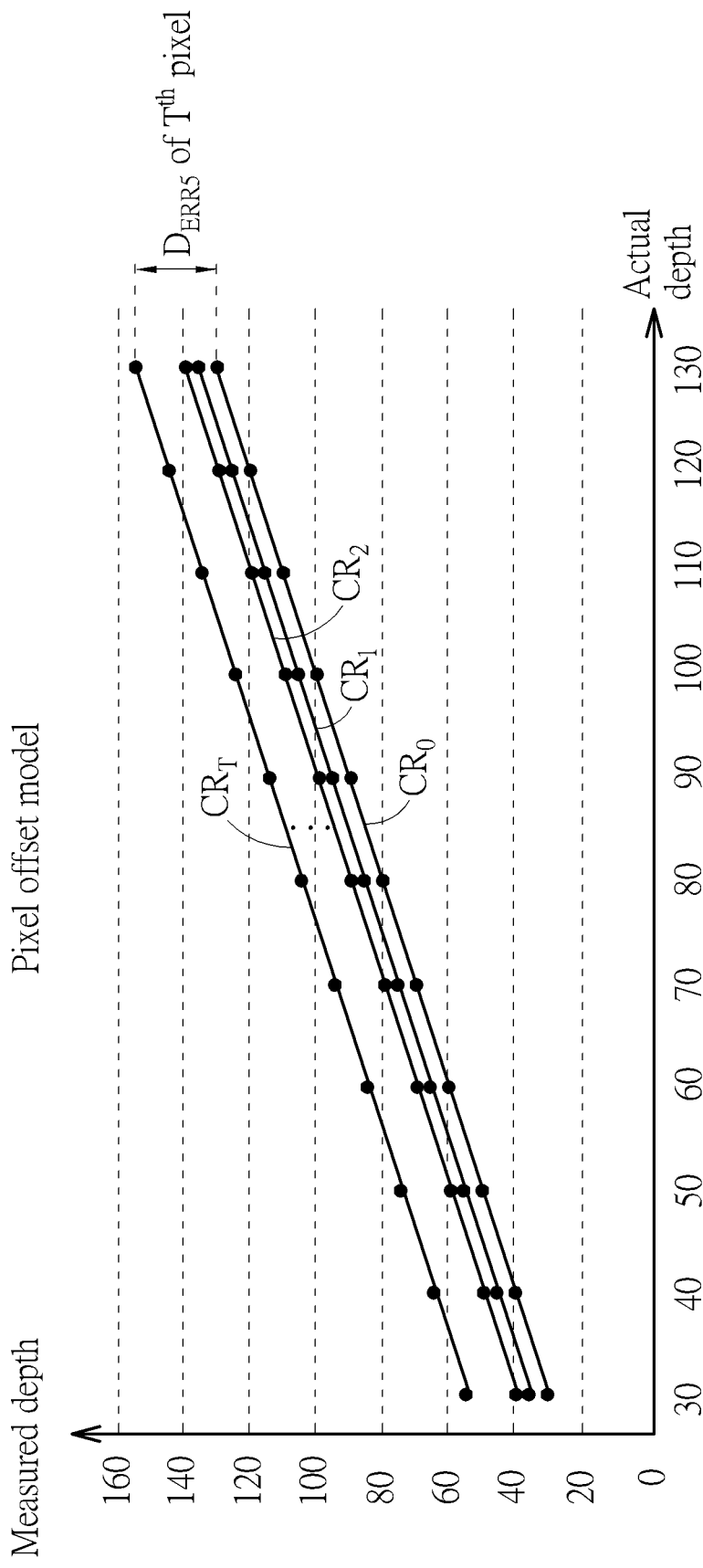
FIG. 3J illustrates a pixel offset model, according to some embodiments.

FIG. 3J illustrates a pixel offset model according to an embodiment. Curve $CR_0$ represents the ideal relationship between the measured depth and the actual depth. Curves $CR_1 \sim CR_T$ represents the non-ideal relationship between the measured depth and the actual depth of the $1^{st}$ to the $T^{th}$ pixels, wherein T is a positive integer. As illustrated, each pixel has its own offset and to be compensated individually. A respective fixed depth error $D_{ERR5}$ will be incurred in each pixel independent of the actual depth. For example, a fixed depth error 0.3 cm is incurred in the $1^{st}$ pixel (as illustrated by curve), a fixed depth error 0.5 cm is incurred in the $2^{nd}$ pixel and so on. After obtaining the pixel offset model, the pixel offset calibration data C14-2 as illustrated in FIG. 3K, which is a part of the offset calibration data C14, can be generated and written into the storage medium 108-1 inside the 3D image generator 108. As such, the 3D image generator 108 can generate the 3D image IM based on the raw data R1 and the pixel offset calibration data C14-2 stored in the storage medium 108-1.

Above descriptions relate to some embodiments of generating the IQ-mismatch calibration data C11, non-linearity calibration data C12, temperature calibration data C13 and offset calibration data C14. In some other embodiments, the sequence of the steps 303, 304, 305 and 306 can be changed. For example, a system may perform steps 303 and 305 first, and then perform steps 304 and 306. In some embodiments, the steps 303, 304, 305 and 306 can be performed in parallel. In some embodiments, a system may perform part of steps (e.g., performing steps 303 and 304 but not performing steps 305 and 306), instead of performing all the steps 303, 304, 305 and 306.

Similarly, in some embodiments, the 3D image generator 108 can execute these calibrations by the sequence of IQ-mismatch calibration data C11, non-linearity calibration data C12, temperature calibration data C13 and offset calibration data C14 during operation. In some other embodiments, the 3D image generator 108 can execute these calibrations by other sequences or execute part of these calibrations during operations.

Figure 4:
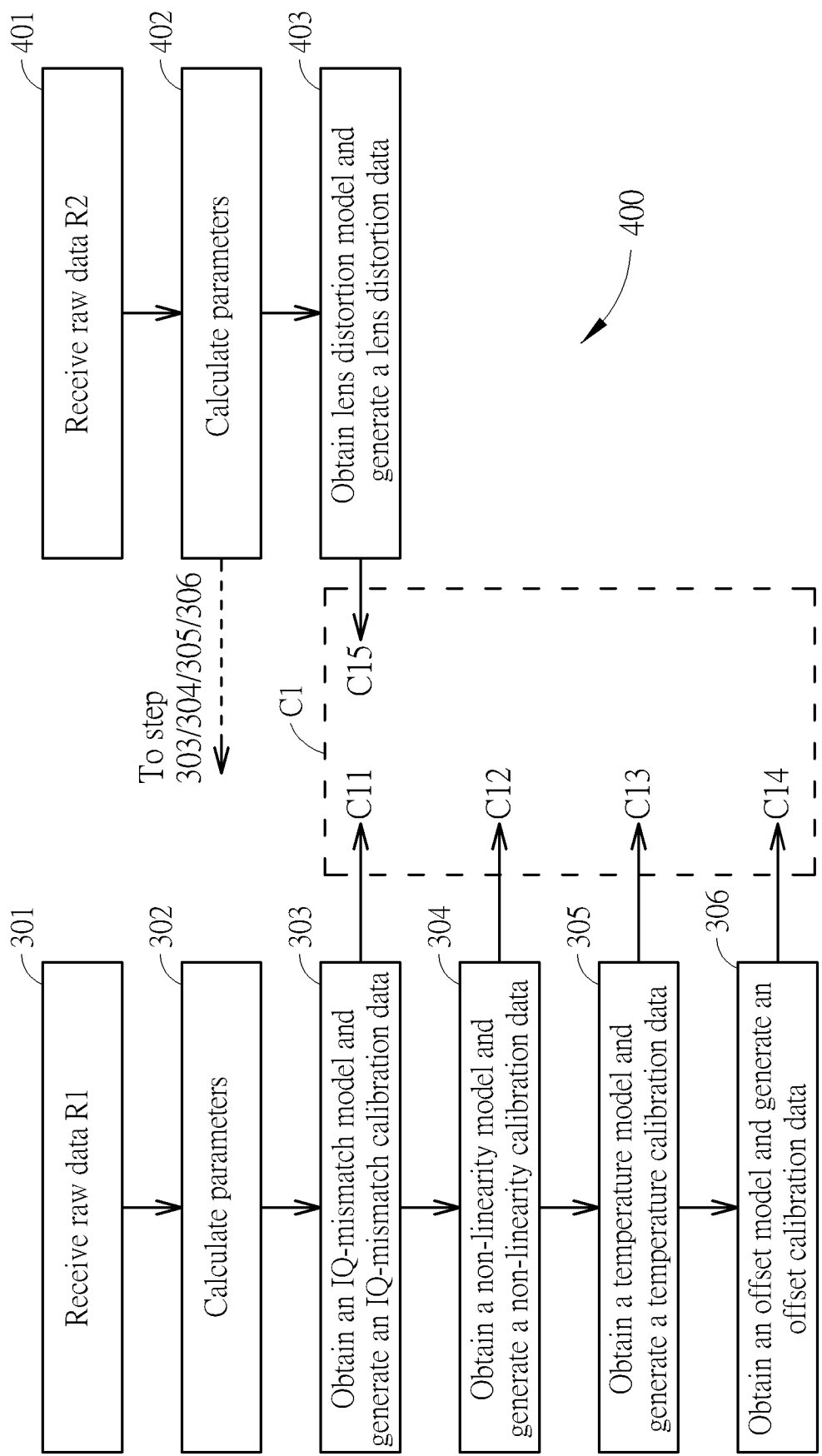
FIG. 4 illustrates a flowchart of generating the calibration data, according to some embodiments.

In addition to calibrating the depth deviation illustrated in the embodiments of FIGS. 3A-3K, the present disclosure in further provides a calibration for non-depth deviation, specifically caused by lens. As illustrated in FIG. 4, a system may integrate two pipelines in the calibration process, where one is performed for depth deviation and the other one is performed for non-depth deviation.

In order to obtain the lens calibration data, as shown in step 401, the calibration data generator 106 receives the raw data R2 (e.g., image amplitude generated under active lighting or image intensity generated under passive NIR lighting) through the image sensor 104 and generates the parameters (e.g., focal lengths, principal point, radial distortion coefficients, tangential distortion coefficients) in step 402. In step 403, the calibration data generator 106 obtains the lens distortion model and generates the lens calibration data C15 to the storage medium 108-1 based on the one or more parameters generated in step 402. In some embodiments, the one or more parameters generated in step 402 can be used in the steps 303, 304, 305 or 306 as a reference.

The embodiments disclosed in FIG. 1 to FIG. 4 are the calibrations at the system level, which is for example performed by the 3D image generator 108 and improves the sensing quality and accuracy. As the dark current may affect the operation of the 3D photodetector 111, the present disclosure further provides configurable 3D photodetector 111 to have different settings based on environmental temperature. As such, the operation of the 3D photodetector 111 can be optimized.

Figure 5:
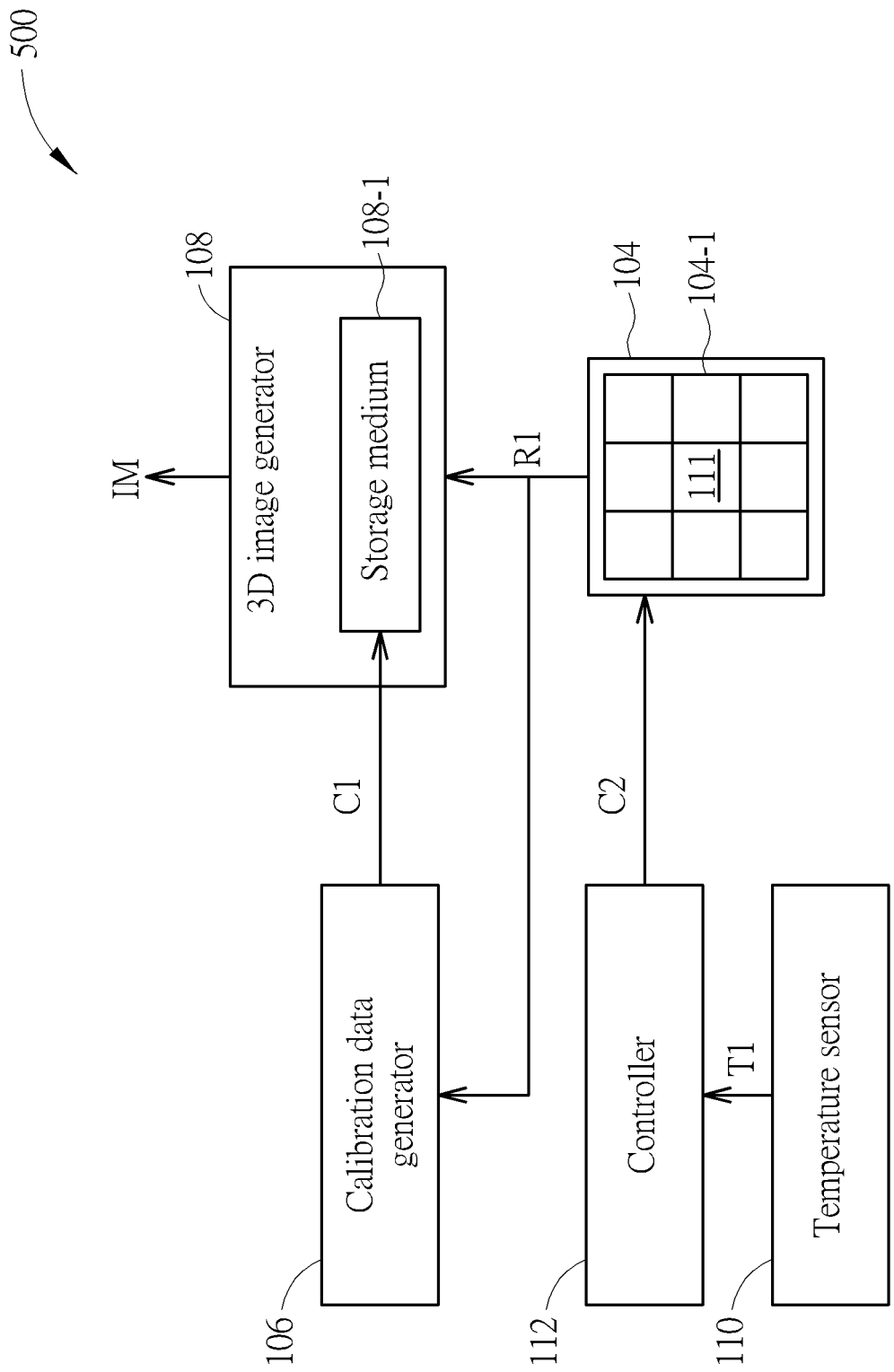
FIG. 5 illustrates a diagram of a photo-detecting apparatus, according to some embodiments.

FIG. 5 illustrates a diagram of a photo-detecting apparatus 500. Compared with the photo-detecting apparatus 100, the photo-detecting apparatus 500 further includes a temperature sensor 110 and a controller 112. The temperature sensor 110 is configured to sense an environmental temperature to generate a temperature information T1. The controller 112 is configured to output a control signal C2 to control the configurations of the image sensor 104 according to the temperature information T1.

Figure 6:
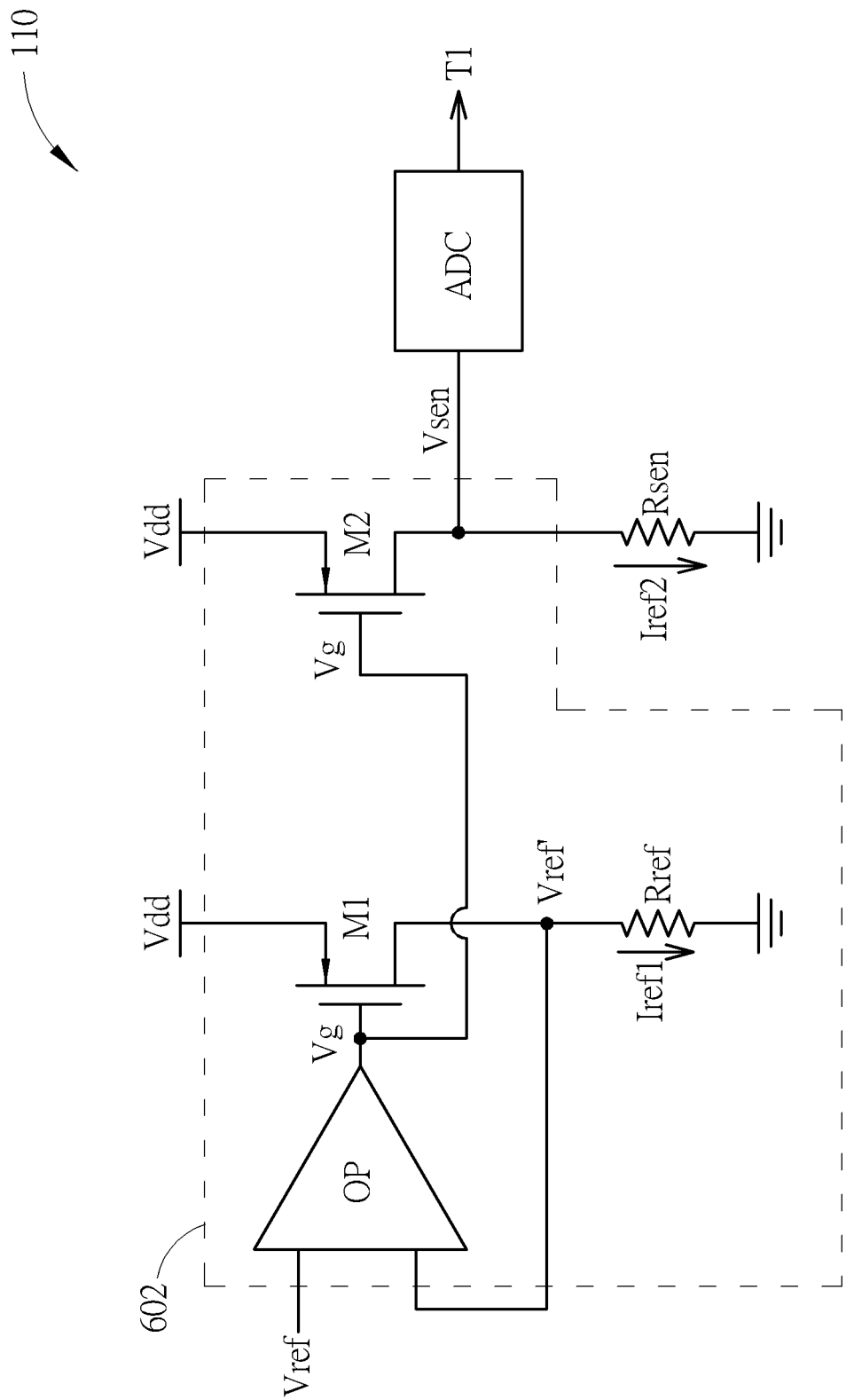
FIG. 6 illustrates a circuit diagram of a temperature sensor, according to some embodiments.

FIG. 6 illustrates an example circuit diagram of the temperature sensor 110. In some embodiments, the temperature sensor 110 includes a reference current generator 602, a sensing resistor Rsen and an analog-to-digital convertor ADC. The reference current generator 602 is configured to generate a reference current Iref1 and a reference Iref2. The structure and connection of reference current generator 602 as illustrated in FIG. 6, including an operational amplifier OP, a transistor M1, a transistor M2 and a reference resistor Rref. The reference resistor Rref is an external resistor, receiving a reference voltage Vref to generate the reference current Iref1. As the reference voltage Vref and the reference resistor Rref are precise, the reference currents Iref1 and Iref2 will be precise as well, which means the reference currents Iref1 and Iref2 are substantially independent of process, voltage and temperature. In addition, the reference current Iref2 is mirrored from the reference current Iref1 according to the aspect ratios of the transistors M1 and M2, the reference current Iref2 could be the same as the reference current Iref1, or could have a predetermined ratio of the reference current Iref1.

Since the resistance of sensing resistor Rsen is varied according to the environmental temperature (e.g., the resistance is getting higher when the environmental temperature is getting higher), the sensing voltage Vsen is also varied according to the environmental temperature. As such, the temperature information T1, which is a digital data, reflects the environmental temperature and will be outputted to the controller 112. In some embodiments, the analog-to-digital convertor ADC can be SAR-ADC, pipeline-ADC, flash-ADC or any other types of ADC.

Figure 7A:
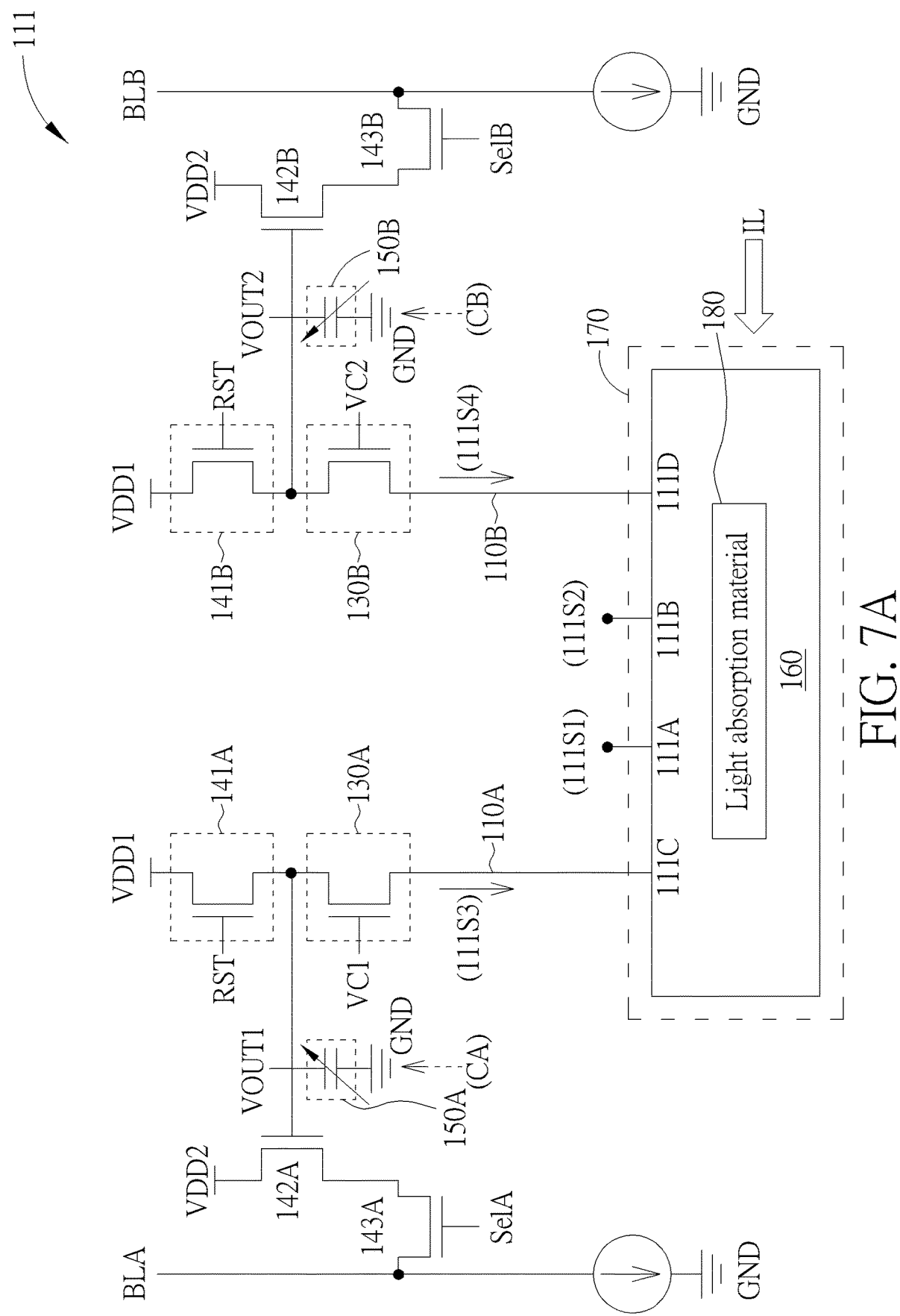
FIG. 7A illustrates a circuit diagram of a 3D photodetector, according to some embodiments.

FIG. 7A illustrates a circuit diagram of the 3D photodetector 111 inside the image sensor 104. The 3D photodetector 111 is configured to perform 3D sensing, including an optical-to-electric converter 170, cascode transistors 130A and 130B, reset transistors 141A and 141B, capacitors 150A and 150B, source-follower transistors 142A and 142B, row-select transistors 143A and 143B and bit-lines BLA and BLB.

The cascode transistor 130A includes a first end coupled to the capacitor 150A, a second end coupled to a collection terminal 111C, and a control end for receiving a control signal VC1. The reset transistor 141A includes a first end coupled to a supply voltage VDD1, a second end coupled to the capacitor 150A, and a control end for receiving a reset signal RST. The source-follower transistor 142A includes a first end coupled to a supply voltage VDD2, a second end, and a control end coupled to the capacitor 150A. The row-select transistor 143A includes a first end coupled to the second end of the source-follower transistors 142A, a second end coupled to the bit line BLA, and a control end for receiving a select signal SelA. The capacitor 150A includes a first end coupled to the first end of the cascode transistor 130A and a second end coupled to a ground voltage GND, where an output voltage VOUT1 is generated on the first end of the capacitor 150A. Furthermore, the capacitance of the capacitor 150A can be adjusted by a configuration signal CA.

The cascode transistor 130B includes a first end coupled to the capacitor 150B, a second end coupled to a collection terminal 111D, and a control end for receiving a control signal VC2. The reset transistor 141B includes a first end coupled to the supply voltage VDD1, a second end coupled to the capacitor 150B, and a control end for receiving the reset signal RST. The source-follower transistors 142B includes a first end coupled to the supply voltage VDD2, a second end, and a control end coupled to the capacitor 150B. The row-select transistor 143B includes a first end coupled to the second end of the source-follower transistors 142B, a second end coupled to the bit line BLB, and a control end for receiving a select signal SelB. The capacitor 150B includes a first end coupled to the first end of the cascode transistor 130B and a second end coupled to the ground voltage GND, where an output voltage VOUT2 is generated on the first end of the capacitor 150B. Furthermore, the capacitance of the capacitor 150B can be adjusted by a configuration signal CB.

The optical-to-electric converter 170 is configured to convert an incident light IL to the photo-currents 111S3 and 111S4 at collection terminals 111C and 111D, and output the photo-currents 111S3 and 111S4 to the cascode transistors 130A and 130B according to the demodulation signals 111S1 and 111S2 inputted to the demodulation terminals 111A and 111B. When the voltage of the demodulation signal 111S1 is larger than the voltage of the demodulation signal 111S2, the photo-current 111S3 will be generated. Contrarily, when the demodulation signal 111S2 is larger than the demodulation signal 111S1, the photo-current 111S4 will be generated. The 3D image generator 108 will determine the depth of the image according to the output voltages VOUT1 and VOUT2. In some embodiments, the demodulation signals 111S1 and 111S2 are square wave signals and collectively form a differential signal. Notably, as an example, one of the demodulation signals 111S1 and 111S2 can be the demodulation signal DM illustrated in FIG. 2.

In some embodiments, the 3D photodetector 111 uses a light absorption material 180 different from the substrate 160 and formed on the substrate 160, to absorb the incident light IL. For example, the light absorption material 180 can use germanium and the material of the substrate 160 can use silicon. As another example, the light absorption material 180 can use III-V semiconductor material.

To optimize the operation of the 3D photodetector 111, some parameters can be configured. In some embodiments, the capacitors 150A and 150B are configurable. The capacitances of the capacitors 150A and 150B can be adjusted according to the environmental temperature. In some embodiments, the reset frequency of the reset signal RST can be adjusted according to the environmental temperature. In some embodiments, the optical integration time Ti can be adjusted according to the environmental temperature. In some embodiments, the supply voltage VDD1, which is used as a reset voltage of pixels, can be adjusted according to the environmental temperature.

Figure 7B:
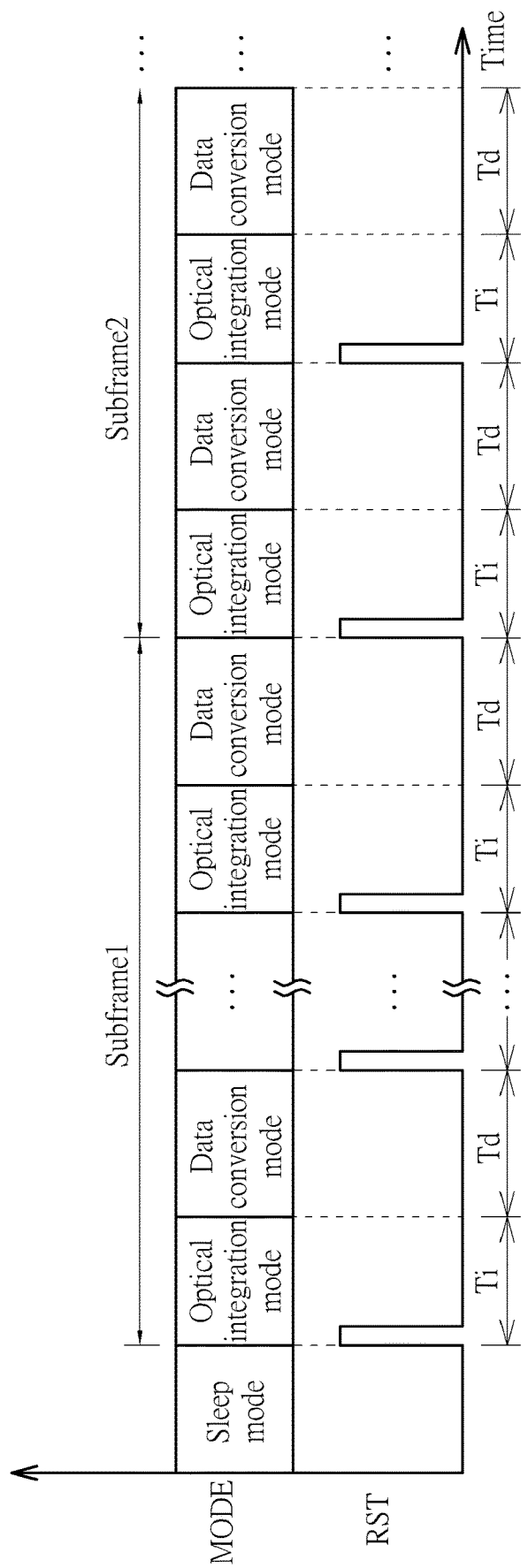
FIG. 7B illustrates a timing diagram of a 3D photodetector, according to some embodiments.

FIG. 7B illustrates a timing diagram of the 3D photodetector 111 inside the image sensor 104. As illustrated in FIG. 7B, the 3D photodetector 111 may operate at a sleep mode, an optical integration mode (labeled by Ti) and a data conversion mode (labeled by Td). During sleep mode, the 3D photodetector 111 has no operation. During integration mode, the 3D photodetector 111 is configured to absorb the incident light IL and the photo-currents 111S3 and 111S4 will be generated. Accordingly, the output voltages VOUT1 and VOUT2 generated on capacitors 150A and 150B will reflect the incident light IL absorbed by the 3D photodetector 111. During data conversion mode, the output voltages VOUT1 and VOUT2 will be read out onto the bit-lines BLA and BLB, respectively. As mentioned, in some embodiments, the optical integration time Ti or the reset frequency 1/(Ti+Td) of the reset signal RST can be adjusted according to the environmental temperature.

Furthermore, as illustrated in FIG. 7B, a plurality of subframes (labeled by Subframe 1, Subframe 2, etc.) will be generated to obtain a final frame during operation. For example, the final 3D frame can be obtained according to an average of these subframes, an average of particular subframes, or providing different weighting for each subframe. For obtaining the final frame with better quality, in some embodiments, the numbers of subframes can be dynamically adjusted according to the environmental temperature, or the rates of subframes can be dynamically adjusted according to the environmental temperature.

Figure 8:
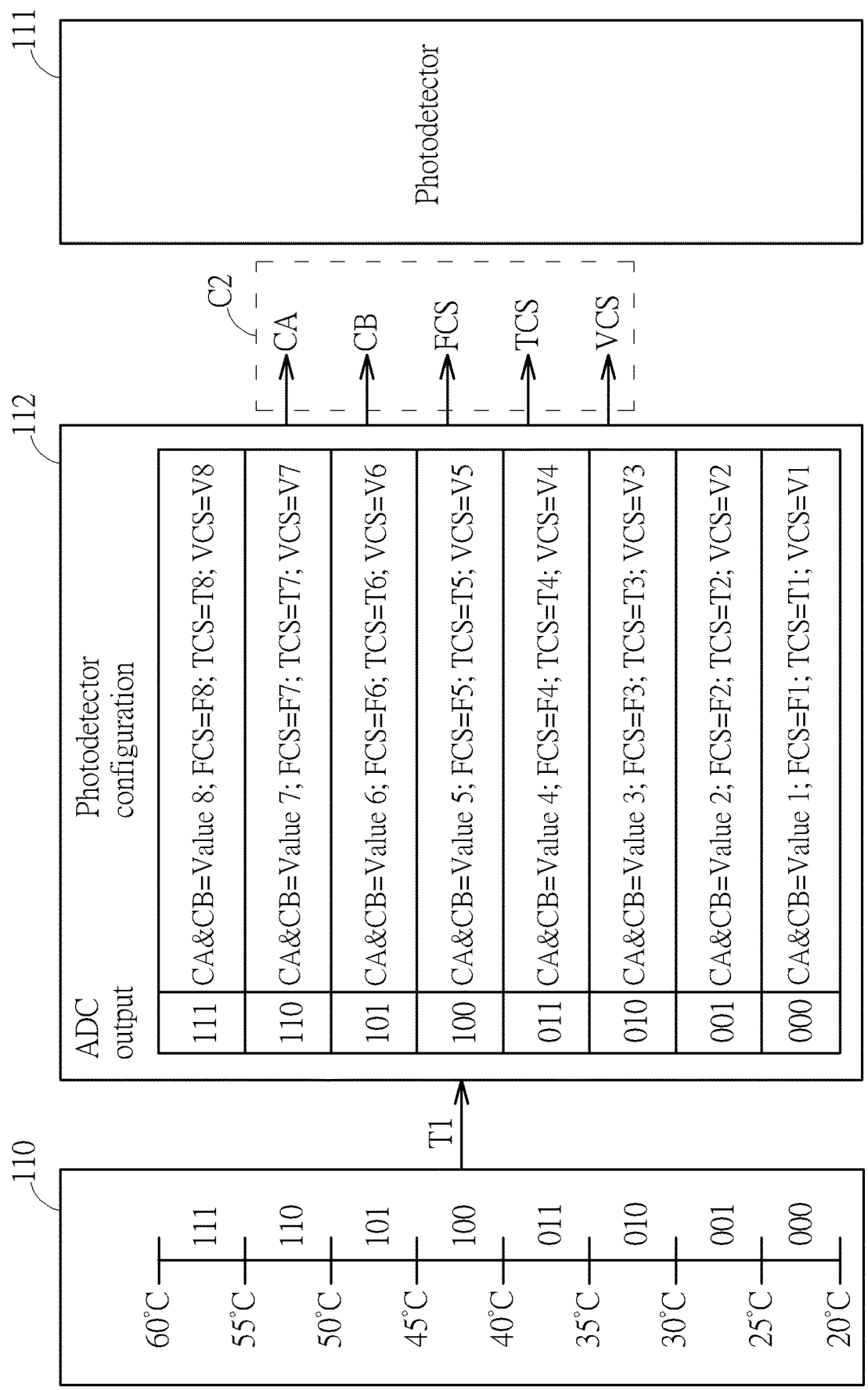
FIG. 8 illustrates a diagram of a controller in connection with a temperature sensor and a 3D photodetector, according to some embodiments.

FIG. 8 illustrates a diagram of the controller 112 in connection with the temperature sensor 110 and 3D photodetector 111. The controller 112 is configured to set the configurations of the 3D photodetector 111 according to the analog-to-digital convertor ADC output signal, which represents the temperature information T1. In some embodiments, the analog-to-digital convertor ADC output is 3-bit, the environmental temperature can be split into 8 ranges, as illustrated in FIG. 8. The controller 112 is configured to generate the control signal C2, including configuration signals CA, CB, FCS, TCS, and/or VCS. The configuration signal CA is configured to adjust the capacitance of the capacitor 150A, the configuration signal CB is configured to adjust capacitance of the capacitor 150B, the configuration signal FCS is configured to adjust the frequency of the reset signal RST, the configuration signal TCS is configured to adjust the optical integration time Ti, and the configuration signal VCS is configured to adjust the supply voltage VDD1. Based on different design requirements, one may use one, two or more configuration signals to configure the 3D photodetector 111. In some embodiments, the controller 112 can be implemented by DSP processor, general purpose processor, application-specific integrated circuit (ASIC), digital circuitry, look-up-table or any combinations thereof.

In addition, in some embodiments, the control signal C2 may further includes a configuration signal (which is not shown in figure) configured to set the numbers of subframes and/or a configuration signal (which is not shown in figure) configured to set the rates of subframes.

As illustrated in FIG. 8, there is a mapping relationship between the temperature information T1 and control signal C2. For example, when the temperature information T1 is 000, the configuration signals CA and CB will be Value 1, the configuration signal FCS will be F1, the configuration signal TCS will be TC1, and/or the configuration signal VCS will be value V1. Other mapping relationship between the temperature information T1 and control signal C2 can refer to the FIG. 8, and the descriptions are hereby omitted.

In some embodiments, when the temperature is getting higher, the capacitances of the capacitors 150A and 150B can be configured to a higher value. Contrarily, when the temperature is getting lower, the capacitances of the capacitors 150A and 150B can be configured to a lower value. For example, when the temperature is 40 degrees, the capacitances of the capacitors 150A and 150B can be configured to 10 fF. When the temperature is 45 degrees, the capacitances of the capacitors 150A and 150B can be configured to 20 fF.

In some embodiments, when the temperature is getting higher, the reset frequency of the reset signal RST can be configured to a higher value. Contrarily, when the temperature is getting lower, the reset frequency of the reset signal RST can be configured to a lower value. For example, when the temperature is 40 degrees, the reset frequency of the reset signal RST can be configured to 5 kHz. When the temperature is 45 degrees, the reset frequency of the reset signal RST can be configured to 6 kHz.

Figure 9A:
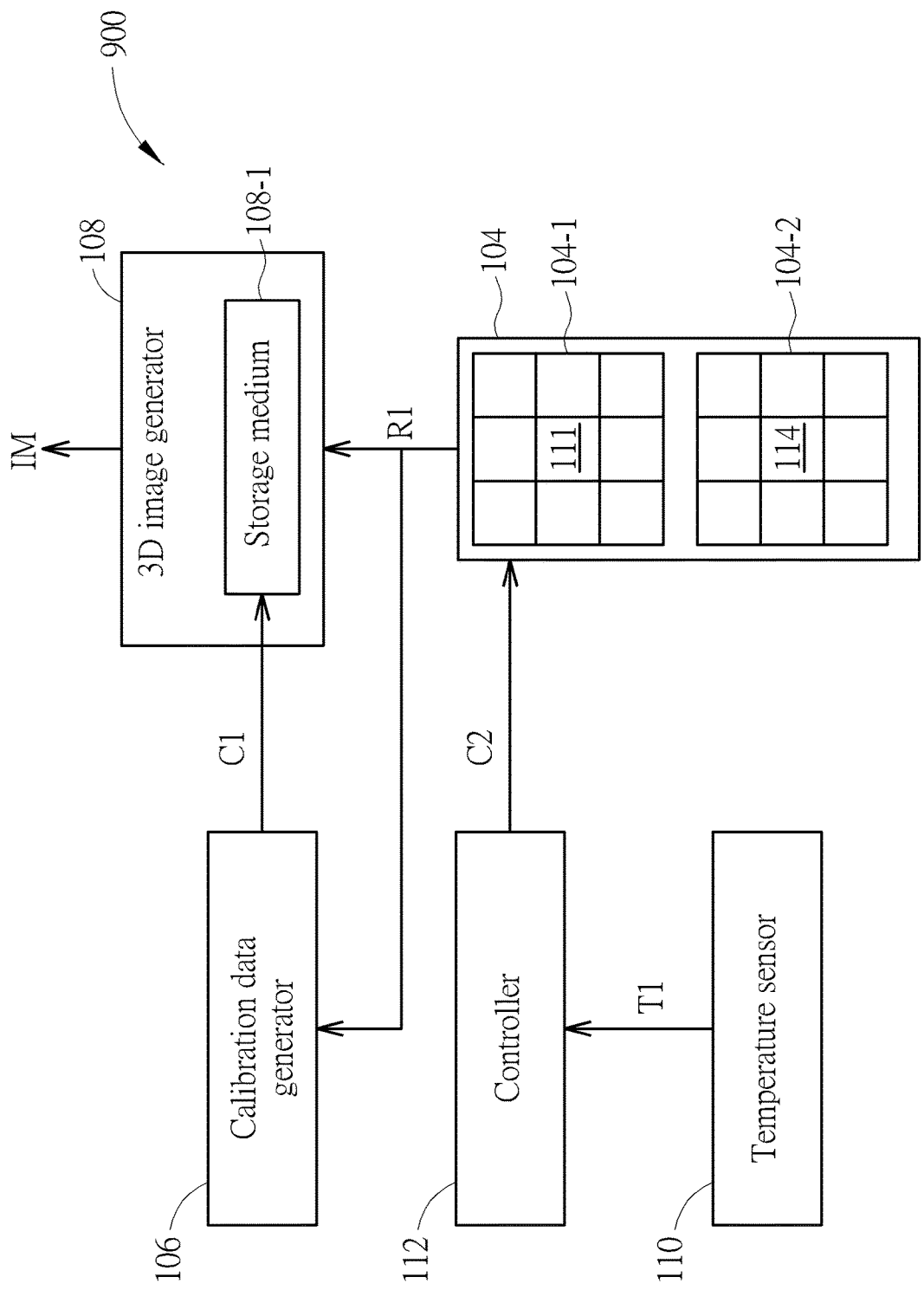
FIG. 9A illustrates a diagram of a photo-detecting apparatus, according to some embodiments.

Furthermore, the present disclosure provides a calibrated photo-detecting apparatus with both 2D and 3D photodetectors and calibration method thereof. FIG. 9A illustrates a diagram of a photo-detecting apparatus 900. Compared with the photo-detecting apparatus 500, the photo-detecting apparatus 900 further includes a pixel array 104-2 including a plurality of 2D photodetectors 114. The pixel array 104-2 is configured to perform 2D sensing and generate a 2D image.

Figure 9B:
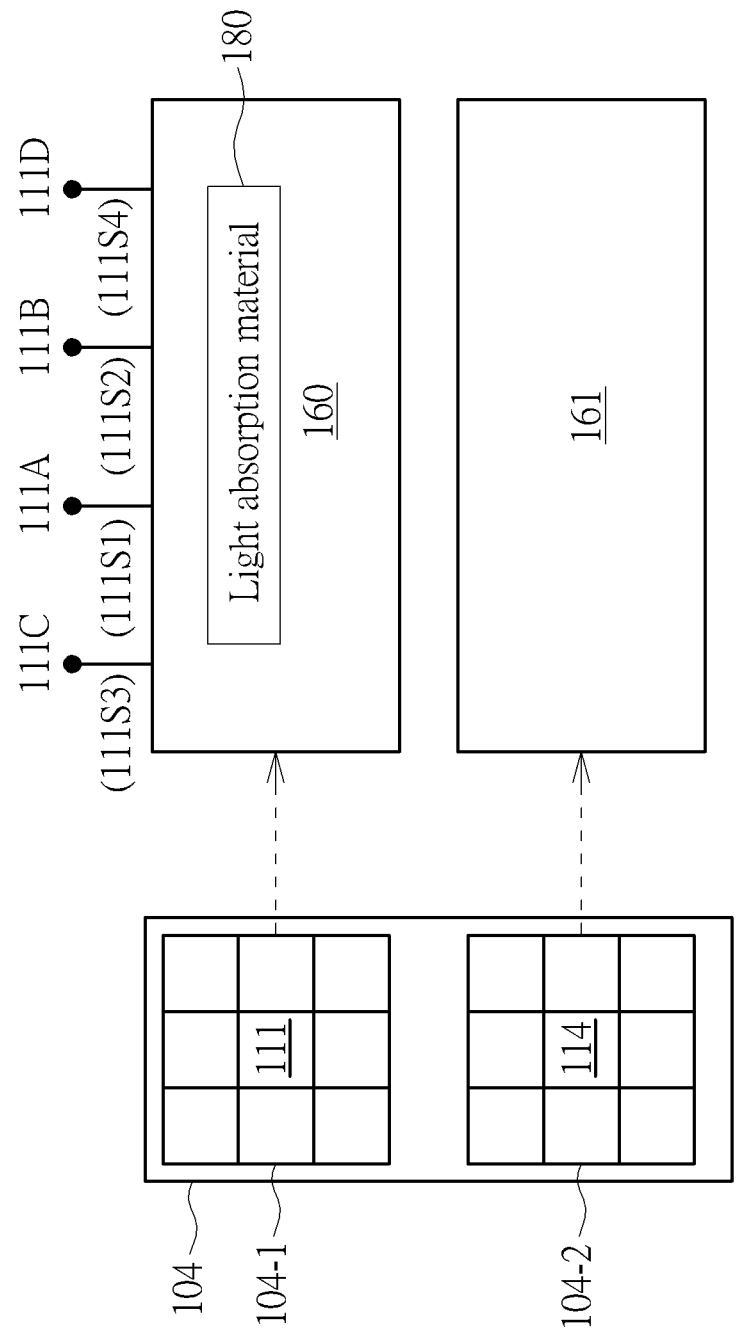
FIG. 9B illustrates a diagram of an image sensor, according to some embodiments.

FIG. 9B illustrates a diagram of the image sensor 104, including the pixel array 140-1 for performing 3D sensing and the pixel array 140-2 for performing 2D sensing. In this embodiment, the 3D photodetector 111 includes the substrate 160 and the light absorption material 180 formed on the substrate 160, where the light absorption material 180 is different from the material of the substrate 160. For example, the light absorption material 180 can use germanium and the material of the substrate 160 can use silicon. In some embodiments, the light absorption material 180 can use III-V semiconductor material. In addition, the 2D photodetector 114 can use a substrate 161 as a light absorption material to perform 2D sensing. The substrate 161 and the substrate 160 can be the same or different. The material of the substrate 161 can use silicon.

Figure 9C:
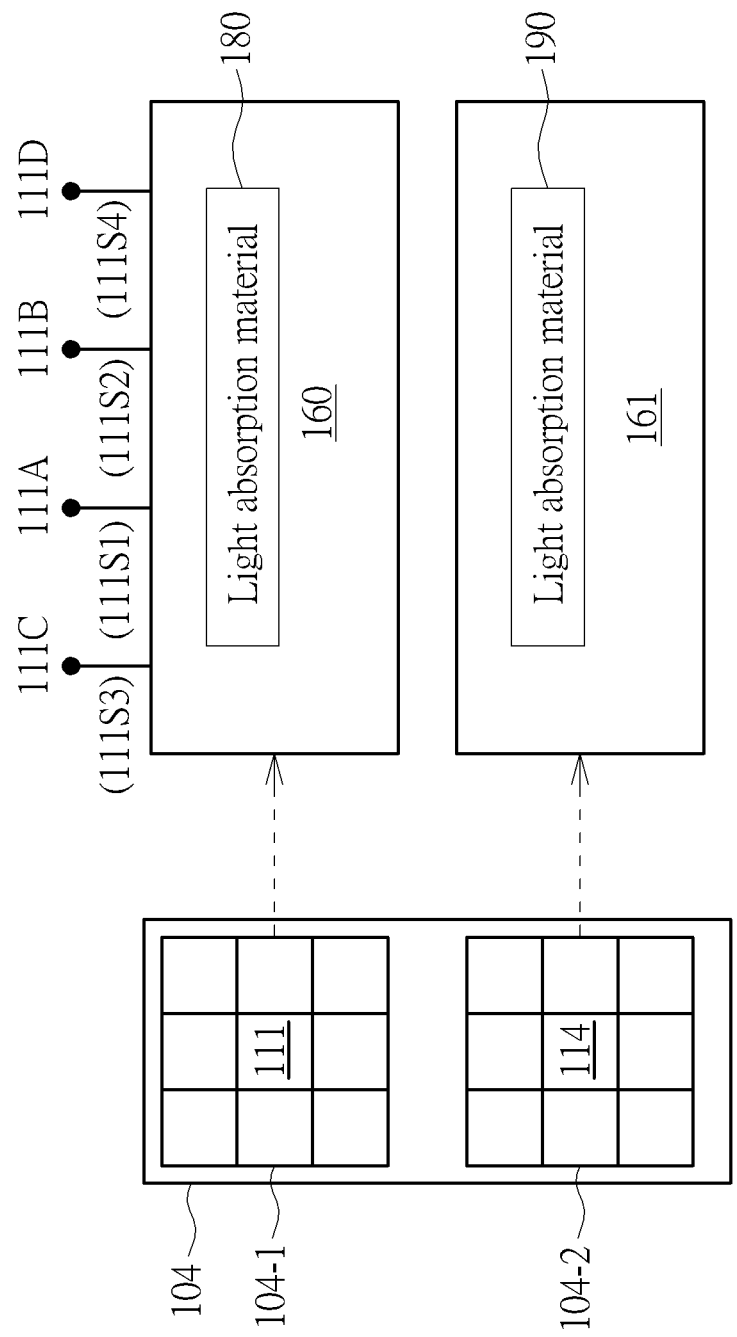
FIG. 9C illustrates a diagram of an image sensor, according to some embodiments.

FIG. 9C illustrates a diagram of the image sensor 104, including the pixel array 140-1 for performing 3D sensing and the pixel array 140-2 for performing 2D sensing. Compared to the embodiment illustrated in FIG. 9B, the 2D photodetector 114 uses a light absorption material 190 different from the material of the substrate 161 to perform 2D sensing. For example, the light absorption material 190 can use germanium and the material of the substrate 161 can use silicon. In some embodiments, the light absorption material 190 can use III-V semiconductor material.

The present disclosure provides the calibrated photo-detecting apparatus and calibration method. According to some embodiments, the calibrations can be executed from system level, including at least one of IQ-mismatch, non-linearity, temperature, offset calibration and the lens offset calibrations. In addition, the configurable photodetector is disclosed, which provides some optimized settings based on different temperatures. Furthermore, the combined 2D and 3D sensing is also disclosed. With these calibration items and settings, not only the image quality and accuracy can be improved, but also the operation is optimized.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A photo-detecting apparatus, comprising:
an image sensor having a plurality of 3D photodetectors, configured to output a raw data, wherein the raw data comprises four phase difference data Q1, Q2, Q3, and Q4, each representing a respective phase difference between a transmitting signal and a receiving signal received by a 3D photodetector of the plurality of 3D photodetectors, wherein the raw data is demodulated by a corresponding demodulation signal of four demodulation signals DM1, DM2, DM3, and DM4, and wherein the four demodulation signals DM1, DM2, DM3, and DM4 are phased 0-degree, 180-degree, 90-degree, and 270-degree from a phase of the transmitting signal, respectively;
a calibration data generator configured to calculate one or more parameters based on the raw data, wherein the one or more parameters include an I-value and a Q-value, wherein the I-value represents a difference between the phase difference data Q2 and Q1, and wherein the Q-value represents a difference between the phase difference data Q4 and Q3; and
a 3D image generator having a storage medium storing a calibration data, configured to output a 3D image based on the raw data and the calibration data;
wherein the calibration data includes an IQ-mismatch calibration data for correcting a depth error generated by a mismatch between the I-value and the Q-value.

2. The photo-detecting apparatus of claim 1, wherein the 3D image generator is configured to output the 3D image by executing the calibration data to adjust the raw data by a sequence of the IQ-mismatch calibration data.

3. The photo-detecting apparatus of claim 1, wherein the calibration data further comprises a lens calibration data.

4. The photo-detecting apparatus of claim 1, further comprising:
   a temperature sensor, configured to sense an environmental temperature to generate a temperature information; and
   a controller, configured to output a control signal to control a configuration of the 3D photodetector according to the temperature information.

5. The photo-detecting apparatus of claim 4, wherein the configuration of the 3D photodetector comprises a capacitance of a capacitor, a frequency of a reset signal, an optical integration time, or a supply voltage.

6. The photo-detecting apparatus of claim 4, wherein the controller is further configured to dynamically adjust a rate of subframes according to the temperature information.

7. The photo-detecting apparatus of claim 1, wherein the image sensor further comprises:
   a substrate; and
   a light absorption material formed on the substrate, wherein the light absorption material is different from a material of the substrate.

8. The photo-detecting apparatus of claim 7, wherein the light absorption material is germanium and the material of the substrate is silicon.

9. The photo-detecting apparatus of claim 1, wherein the image sensor further comprises a plurality of 2D photodetectors configured to perform 2D sensing.

10. A calibration method, comprising:
    outputting, by an image sensor having a plurality of 3D photodetectors, a raw data, wherein the raw data comprises a phase difference data (Q1, Q2, Q3, Q4) representing a phase difference between a transmitting signal transmitted by a transmitter and a receiving signal received by a respective 3D photodetector of the plurality of 3D photodetectors, wherein the raw data is demodulated by a corresponding demodulation signal of four demodulation signals DM1, DM2, DM3, and DM4, and wherein the four demodulation signals DM1, DM2, DM3, and DM4 are phased 0-degree, 180-degree, 90-degree, and 270-degree from a phase of the transmitting signal, respectively;
    calculating, by a calibration data generator, one or more parameters based on the raw data, wherein the one or more parameters include an I-value and a Q-value, wherein the I-value represents a difference between the phase difference data Q2 and Q1, and wherein the Q-value represents a difference between the phase difference data Q4 and Q3; and
    outputting, by a 3D image generator having a storage medium storing a calibration data, a 3D image based on the raw data and the calibration data;
    wherein the calibration data includes an IQ-mismatch calibration data for correcting a depth error generated by a mismatch between the I-value and the Q-value.

11. The calibration method of claim 10, wherein outputting the 3D image further comprises executing the calibration data to adjust the raw data by a sequence of the IQ-mismatch calibration data.

12. The calibration method of claim 10, wherein the calibration data further comprises a lens calibration data.

13. The calibration method of claim 10, wherein the calibration data stored in the storage medium comprises a look-up table.

14. The calibration method of claim 10, further comprising:
    generating, by a temperature sensor, a temperature information representing an environmental temperature; and
    outputting, by a controller, a control signal to control a configuration of the 3D photodetector according to the temperature information.

15. The calibration method of claim 14, wherein the configuration of the 3D photodetector comprises a capacitance of a capacitor, a frequency of a reset signal, an optical integration time or a supply voltage.

16. The calibration method of claim 14, further comprising dynamically adjusting, by the controller, a rate of subframes according to the temperature information.

17. The calibration method of claim 10, wherein the image sensor further comprises:
    a substrate; and
    a light absorption material formed on the substrate;
    wherein the light absorption material is different from a material of the substrate.

18. The calibration method of claim 17, wherein the light absorption material is germanium and the material of the substrate is silicon.

19. The calibration method of claim 10, wherein the image sensor further comprises a plurality of 2D photodetectors configured to perform 2D sensing.

* * * * *